Patented June 28, 1932

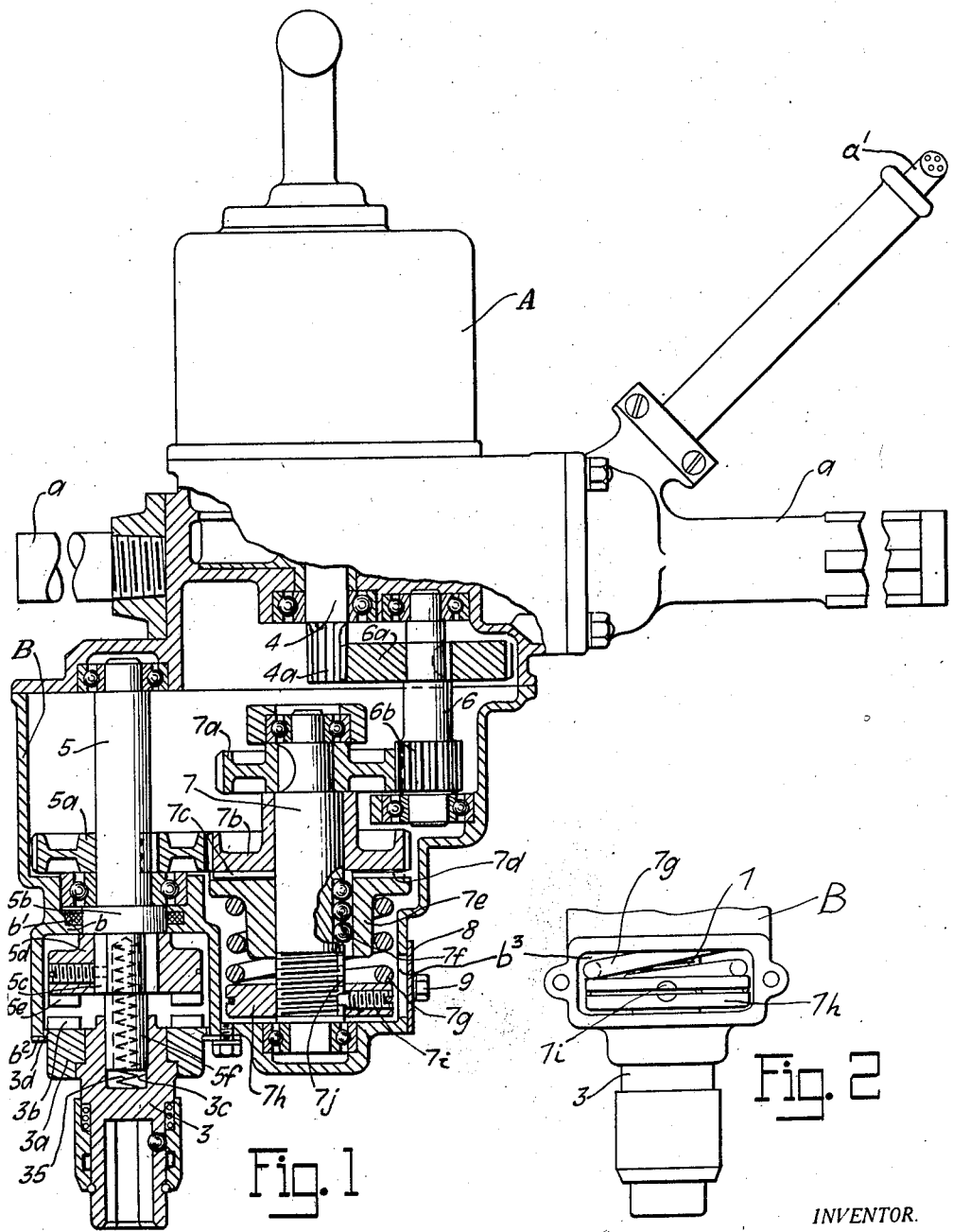

1,864,844

UNITED STATES PATENT OFFICE

LEON F. MEUNIER, OF CLEVELAND, OHIO, ASSIGNOR TO CHICAGO PNEUMATIC TOOL COMPANY, OF NEW YORK, N. Y., A CORPORATION OF NEW JERSEY

TRANSMISSION APPARATUS

Application filed November 12, 1928. Serial No. 318,636.

This invention relates to apparatus for transmitting rotary motion and more particularly to gear trains for power machines and tools. It has special application to machines and tools for driving securing members of the threaded type such as nuts, screws and the like and for similar operations in which the final drive member of the apparatus is liable to meet a gradually increasing or sudden resistance which will slow it down or bring it to a full stop.

Among the objects of the invention are to relieve the operator or the mechanism, or both, of the torque reaction due to sharp slowing down or stopping of the final drive member, to provide a gear train having features of simplicity and compactness, and in general to improve prior devices and apparatus in the interest of more efficient operation and service.

In order to illustrate the invention, one concrete embodiment thereof is shown in the accompanying drawing in which:

Fig. 1 is a vertical sectional view partly in elevation; and

Fig. 2 is a fragmentary elevational view of the lower right-hand side of the gear case in Fig. 1 showing the cover plate removed to give access to the adjusting nut of the throwout clutch.

The embodiment of the invention, chosen for the purpose of illustration, comprises a power machine or tool of the portable type having a casing A which encloses a prime mover of any suitable or desired type, in the present instance an electric motor. The casing has handles $a$ by which the machine may be manually supported and directed to the work, the power for operating the motor being supplied through a cable $a'$ which may communicate with the motor through one of the handles as shown. Below the motor casing, and rigidly secured thereto, is a transmission or gear casing B from which projects a tool shaft 3 provided on its lower end with a suitable means for directly engaging the work or having a socket for receiving suitable working tool members such as screw driver bits, nut sockets, and the like to adapt the tool for driving securing members and for performing similar operations.

Within transmission casing B is disposed a gear train for modifying the speed of the motor to the requirements of the work to be performed, the gear train including a novel arrangement of clutch mechanism for relieving the operator and the mechanism of shocks and a portion of the strain incident to the slowing up or sudden stopping of tool shaft 3 when excessive resistance is encountered, as when a screw or nut is driven home. In the form shown, the gear train includes, in addition to a primary or driving shaft 4 and a driven shaft 5, two intermediate shafts 6 and 7, all of which shafts are suitably supported by bearings as indicated. Primary shaft 4, in the present instance is the armature shaft of the motor and has a pinion 4$a$ constantly in mesh with a gear 6$a$ keyed to shaft 6, the latter having in turn a pinion 6$b$ constantly in mesh with gear 7$a$ on shaft 7. Shaft 7 has a gear 7$b$ loosely mounted thereon but constantly in mesh with a gear 5$a$ keyed to driven shaft 5. Shaft 5 has a collar or radial flange 5$b$ which makes a running fit in a bore in partition $b$ of gear case B which partition is provided with a packing $b'$ to prevent leakage of grease or other lubricant from gear case B. Shaft 5 has an extension 5$c$ beyond partition $b$ to which is rigidly secured a clutch head 5$d$ provided with clutch teeth 5$e$ for cooperation with a clutch head 3$a$ having clutch teeth 3$b$ on tool shaft 3. A further reduced extension 5$f$ of shaft 5 projects within an axial bore 3$c$ of shaft 3 with a sliding fit, a spring 35 being arranged to urge tool shaft 3 outwardly so that cooperating clutch teeth 3$b$ and 5$e$ are normally out of contact, the extent of the projection of tool shaft 3 from gear case B being limited by a stop flange 3$d$ on its clutch head 3$a$ which engages a perforated stop plate $b^2$ suitably secured to gear case B at the base of the recess in the latter in which clutch head 5$d$ is mounted.

Disposed in juxtaposed parallelism with the normally disengaged main clutch between shafts 3 and 5, is a supplemental automatic throw-out clutch by which the driving connection from driving shaft 4 to tool shaft 3 may be maintained until a predetermined resistance is encountered by the latter. In the present instance this throw-out clutch is mounted upon intermediate shaft 7, one of the clutch members being the loose gear 7b which has upon its lower side clutch teeth 7c which are normally in engagement with clutch teeth 7d of clutch member 7e which is slidably mounted upon shaft 7 and keyed thereto by suitable means such as one or more series of balls 7f seated in registering axial grooves in shaft 7 and clutch member 7e. Clutch member 7e is yieldingly forced against loose gear member 7b by a coil spring 7g which encircles shaft 7 and the lower reduced portion of clutch member 7e. The tension of spring 7g is regulated by a nut 7h threaded upon the lower end of shaft 7. A lock screw 7i, threaded into a radial bore in nut 7h, is arranged to engage one or more axial grooves 7j in shaft 7 to lock nut 7h in adjusted position. Access to nut 7h to change the adjustment of the same is provided by an elongate opening $b^3$ in gear case B which is normally closed by a cover plate 8 held in place by screw bolts 9.

The operation of the apparatus is as follows. When the operator presses the machine to the work, tool shaft 3 on engagement with the work is forced inwardly causing main clutch teeth 3b and 5e to mesh. The securing member is then driven at the speed determined by the gear train in transmission case B until the resistance encountered by the tool shaft causes the smaller teeth 7c and 7d of the supplemental throw-out clutch to ride upon one another out of mesh as the yielding resistance of spring 7g is overcome. Clutch teeth 7c and 7d are preferably so arranged that they mesh in a minimum number of positions per rotation, so that the shocks transmitted by the engaging and disengaging of the clutch teeth are minimized and cushioned so as to relieve both the mechanism and the operator. The clicking noise made by the engaging and disengaging of the throw-out clutch serves as a signal to the operator that the securing member is driven home so that he may withdraw the tool from the work, whereupon the main clutch will be promptly disengaged through the action of spring 35.

From the above it is apparent that the present invention not only gives relief and protection to the operator and to the mechanism but also provides a very compact transmission arrangement which reduces the overall dimensions of the machine or tool thereby enhancing the convenience of its operation. An additional advantage lies in the fact that the supplemental clutch which is subject to frequent clutching and declutching operations is at all times adequately lubricated since it is disposed wholly within the gear casing which is kept well packed with lubricant. The main clutch between the tool shaft 3 and driven shaft 5 does not throw-out when securing members are being driven but does permit convenient application and centering of the tool shaft before the driving operation begins.

While a preferred form of the invention has been herein shown and described, it is to be understood that the invention is not limited to the specific details thereof but covers all changes, modifications, and adaptations within the scope of the appended claims.

I claim as my invention:

1. A portable power tool having a casing, a motor therein, a tool shaft projecting beyond said casing, and transmission means within said casing between said motor and said shaft including a gear train and a plurality of clutches, said clutches being disposed in juxtaposition on parallel axes, one of said clutches being arranged automatically to break the driving connection to said tool shaft when the latter encounters a predetermined resistance.

2. A portable power tool having a casing, a motor therein, a tool shaft projecting beyond said casing, transmission means within said casing between said motor and said shaft including a gear train and a plurality of clutches, said clutches being disposed in juxtaposition on parallel axes, one of said clutches being of the automatic throw-out type and immersed in the lubricant within the tool casing, and means providing for convenient adjustment of said last-named clutch.

3. In a portable power tool having a casing, a motor therein, a driven spindle rotatably mounted in said casing, transmission mechanism between said motor and said spindle including a shaft adjacent said spindle and interengaging members on said shaft and spindle, one of said members being fixed to said spindle to turn therewith and the other member being loose on said shaft, automatic clutch means for releasably effecting a driving engagement between said loose member and said shaft, adjusting means for said automatic clutch means, a tool shaft in line with said spindle, and cooperating means on said spindle and tool shaft for establishing a driving relation therebetween only when said tool shaft engages the work.

4. In a portable power tool having a casing, a motor therein, a driven spindle rotatably mounted in said casing, transmission mechanism between said motor and said spindle including a shaft adjacent said spindle and interengaging members on said shaft and spindle, one of said members being fixed to said spindle to turn therewith and the other member being loose on said shaft, means for releasably effecting a driving engagement between said loose member and said shaft, a tool shaft in line with said spindle and slidably and rotatably mounted thereon, said tool shaft being arranged to project from said casing to engage the work, and cooperating clutch means on said tool shaft and spindle arranged to be brought into engagement on inward movement of said tool shaft.

Signed by me at Cleveland, in the county of Cuyahoga and State of Ohio this 5th day of November, 1928.

LEON F. MEUNIER.